Dec. 27, 1966  H. PUHM  3,294,259
APPARATUS FOR UNSTACKING A PLURALITY OF PLATELIKE ELEMENTS FROM
DIFFERENT SUPPLIES IN A PREDETERMINED SEQUENCE
Filed March 23, 1964  2 Sheets-Sheet 1

INVENTOR.
HELMUT PUHM
BY
E. M. Squire
his attorney

Dec. 27, 1966            H. PUHM            3,294,259
APPARATUS FOR UNSTACKING A PLURALITY OF PLATELIKE ELEMENTS FROM
DIFFERENT SUPPLIES IN A PREDETERMINED SEQUENCE
Filed March 23, 1964            2 Sheets-Sheet 2
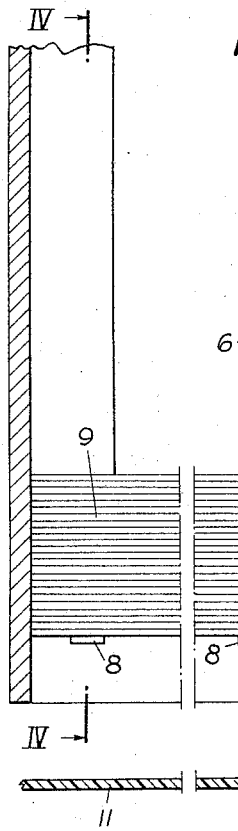
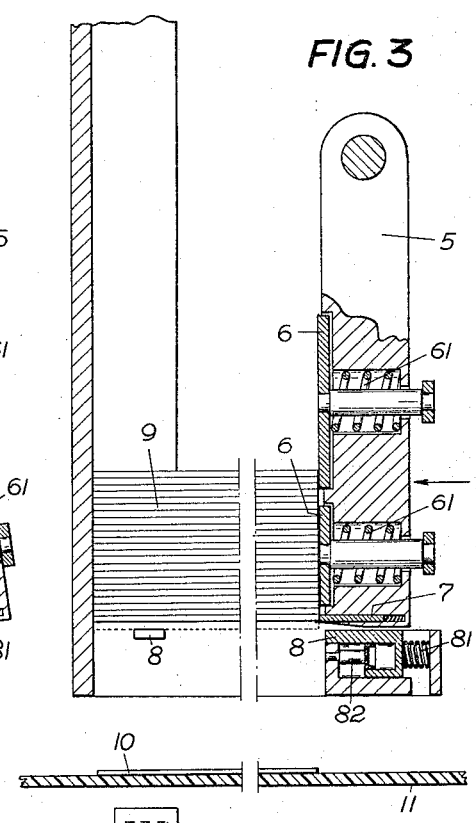
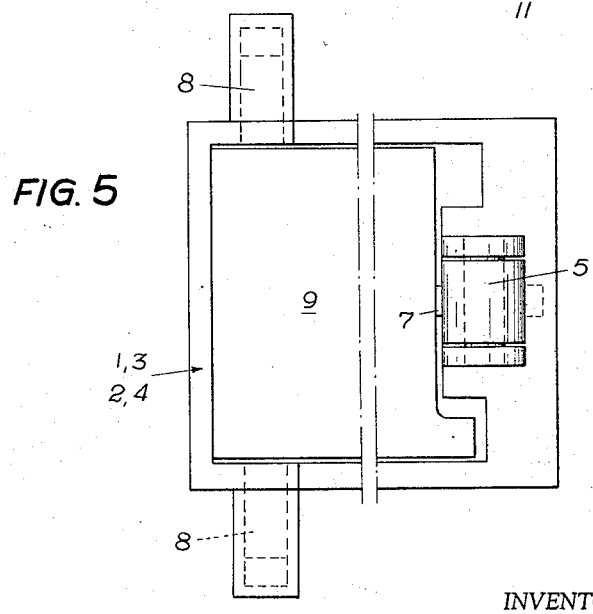
INVENTOR.
HELMUT PUHM
BY
E. M. Squire
his attorney United States Patent Office 3,294,259
Patented Dec. 27, 1966

3,294,259
APPARATUS FOR UNSTACKING A PLURALITY OF PLATELIKE ELEMENTS FROM DIFFERENT SUPPLIES IN A PREDETERMINED SEQUENCE
Helmut Puhm, Graz, Austria, assignor to AGA-Elbak Batteriewerke Gesellschaft m.b.H.
Filed Mar. 23, 1964, Ser. No. 353,788
Claims priority, application Austria, Apr. 3, 1963, A 2,697/63
11 Claims. (Cl. 214—8.5)

This invention relates to an apparatus for taking plates and separators for storage batteries from stacks and building them up in the form of blocks. Each cell of the known lead-acid storage batteries comprises a number of positively charge and negatively charged plates, which are separated from each other by diaphragms of insulating material, such as wood, woven glass fabric, cellulose, sintered plastic or the like. These diaphragms are called separators. They must be highly porous so that the ions can migrate without difficulty between the anodic and cathodic plates during the charging and discharging processes. On the other hand, the separators must prevent any equalization of potential between the positive and negative plates. For this reason the separators must not have any defective portions, such as relatively large pores, abraded portions, cracks or the like, through which an equalization of potential could take place. In order to minimize the internal resistance of the batteries, which substantially influences the storage capacity of the batteries, and in order to enable the accommodation of a maximum number of pairs of plates in one cell, the separators must be as thin as possible so that they are highly fragile.

In the usual and known method of introducing the separators between the plates, the desired number of positive and negative plates are first connected in parallel by soldered connections at their top edge to form so-called positive and negative sets, which are then pushed one into the other so that there is one positive plate between any two adjacent negative plates. Then the separators are inserted between the positive and negative plates by carefully bending the plates apart and then inserting the separators into the spaces between the plates. This operation must be performed with great care so that the plates will not be broken out. This work is time-consuming and adds substantially to the manufacturing costs. The work depends also on the reliability of the worker because the lack of even a single separator will render a battery useless.

For these reasons, it has been attempted to place the separators between the plates before the latter were soldered together. For this purpose a positive plate was taken from a stack of positive plates, a separator from a stack of separators was placed on one plate, a negative plate was taken from a stack of negative plates and placed on the separator, and this cycle was repeated so that a stack of positive and negative plates which are insulated from each other is gradually built up. When all positive and negative plates as well as the separators required for a cell have been combined, the positive and negative plates are subsequently connected by soldered connections.

Hence, in this process, the plates and insulators were stacked by hand into a block and the plates were subsequently soldered together. It has been attempted to perform a similar process mechanically in an automatic manner. This involves the difficulty that individual plates must be mechanically withdrawn from a stack of plates and be combined in the manner described hereinbefore to form a block of plates. A solution to this problem is described in the German patent specification No. 1,082,950, according to which the lowermost plate and the lowermost separator are pushed by means of flat slides, which must have approximately the thickness of the plate or separator, from a stack of plates and a stack of separators, respectively, onto a platform, on which the block of plates is built up. This lowermost plate cannot be pushed out, however, if the entire weight of the stack of plates rests on the lowermost plate. The plate has a rough surface and can be displaced only if the stack lying over the plate to be displaced is lifted to relieve the lowermost plates. For this reason it has been proposed to use for this purpose a plurality of jaws, which laterally grip and lift the stack of plates which is disposed above the lowermost plates. Owing to the inevitably large tolerance of the dimensions of the plates, this gripping cannot be performed satisfactorily so that the stack of plates is not always reliably lifted. Besides, the displacement even of the relieved plate results in the formation of a large amount of highly toxic dust of lead and oxides of lead. In addition, the known apparatus has an extremely complicated design so that its operation is difficult and the apparatus is liable to be deranged.

From the U.S. patent specification No. 2,790,538 it is known to lift the foremost plate or separator from horizontal stacks thereof by means of suction cups and to place the plate or separator on a conveyor belt, which feeds the plates and separators in the desired order to collecting boxes. This known machine has an extremely complicated design so that it is expensive and highly liable to be deranged. Besides, it is difficult to refill the horizontal stacks of plates with new plates.

It is an object of the invention to provide an apparatus for taking plates and separators for storage batteries from stacks and for collecting the plates and separators in blocks, which apparatus avoids the disadvantages of known apparatus. A specific object of the invention is to provide a machine which has a simple structure and is reliable in operation so that the apparatus can be manufactured at low cost and operated in a simple manner.

The essential feature of the apparatus according to the invention resides in that the conveyor belt is disposed below magazines for holding stacked plates and separators, respectively, which magazines are closed at the bottom by retractable claws, and that each plate magazine is provided at least on one side with a device for retaining the stack of plates, and, if desired, the stack of separators, from the second plate or second separator, which retaining device is releasable in alternation with the claws. The plates and separators are vertically fed by a free fall from the magazines onto the conveyor belt so that the difficulties which are involved in the horizontal displacement of plates or separators from the underside of a stack or in the lifting of the stack for relieving the lower plates are eliminated. Above all, damage to the plates and separators is avoided and the movement of the plates cannot result in the formation of toxic lead dust.

In a preferred embodiment of the apparatus according to the invention, each magazine has a wide side wall, which is adjoined on each side by a narrow side wall whereas the fourth side is open and a retaining device acting on the edges of the plates or separators is provided on this fourth side. This retaining device consists, e.g., of a pivoted pressure lever, which carries preferably a plurality of superimposed, resilient gripping jaws. Further according to the invention, the retaining device comprises a claw, which is preferably resilient and which is associated with the last but one plate or the last but one separator of a stack and which is approximately as thick as a plate or a separator, respectively.

Finally, the invention proposes to provide claws at each of the narrow side walls and on the open side of each magazine and to form that portion of each claw which is disposed outside the magazine as a pneumatic cylinder, which co-acts with a stationary piston and is urged by a spring into its operative position.

Details of the invention will be explained more fully with reference to the drawing, which shows diagrammatically and by way of example an embodiment of an apparatus for taking plates and separators for accumulators from stacks and for collecting these plates and separators in blocks.

FIG. 2 is an enlarged sectional view for holding plates or separators.

FIG. 3 shows a magazine after the release of a plate or separator in a view which is similar to that of FIG. 2.

FIG. 5 is a top plan view showing a magazine.

Figure 1:
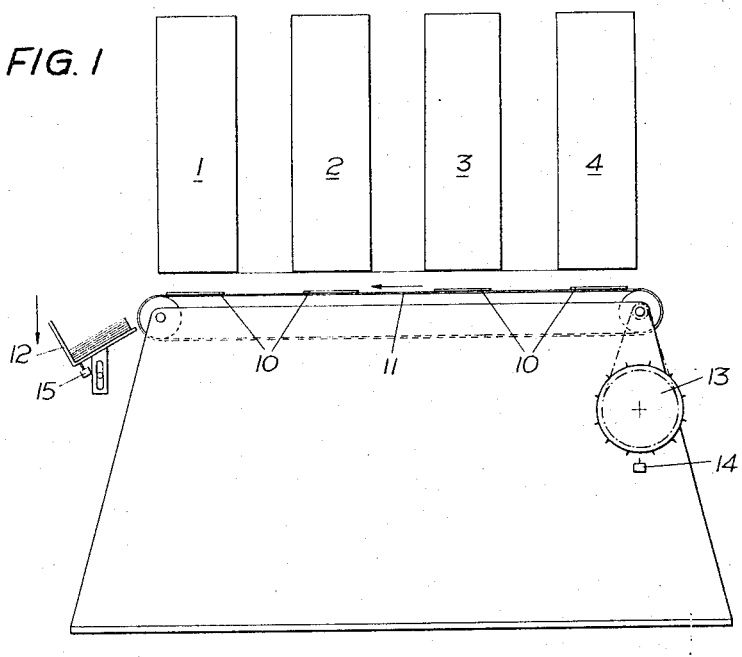
FIG. 1 is a side elevation showing the essential parts of the apparatus.
Figure 4:
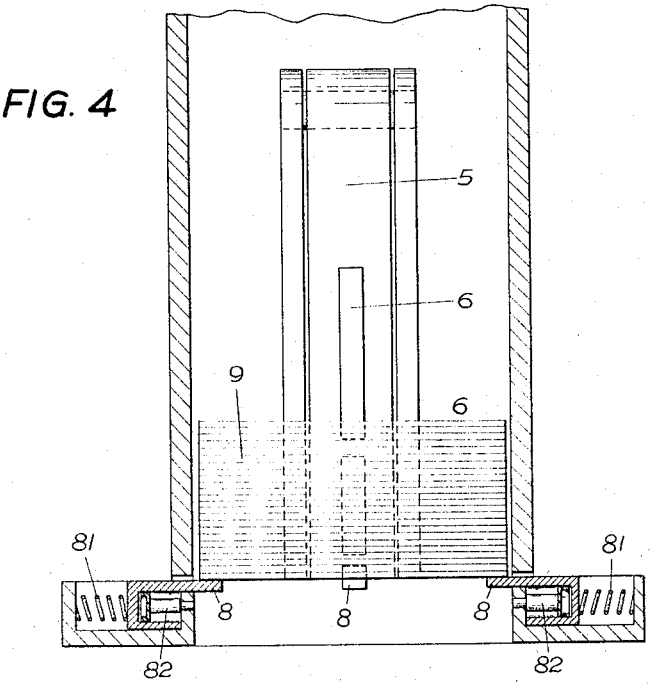
FIG. 4 is a sectional view taken on line IV—IV of FIG. 2.

In the apparatus which is shown by way of example, magazines are disposed over a conveyor belt 11. These magazine include a magazine 1 for holding negative plates, a magazine 2 for holding separators, a magazine 3 for holding positive plates, and a magazine 4 for holding separators in a reversed position relative to those in the magazine 2.

Each magazine has a wide side wall, which is adjoined on opposite sides by two narrow side walls. The magazine is open on its fourth side so that it has a U-shaped cross-section. This form of the magazine enables a simple re-filling of plates or separators.

To support the stacked plates or separators, claws 8 are provided at the lower ends of the magazine 1 to 4 at the narrow side walls and on the open side. The claws 8 are urged into their effective position by springs 81 and may be retracted from their effective position, e.g., by pneumatic pistons 82. In order to ensure that the stacks will be retained when the claws 8 have been retracted whereas the lowermost plate or the lowermost separator will then by released, each magazine has associated with it on its open side a retaining device, which is rendered operative in alternation with the claws 8. In the embodiment which is shown by way of example, the retaining device comprises a pivoted pressure lever 5, which carries preferably a plurality of gripping jaws 6, which are disposed one over the other. Alternatively, the pressure lever may be moved toward and away from the plates by other means. The gripping jaws 6 are urged forwardly against the edges of the plates or separators by springs 61. For a more reliably retaining action in view of the existing manufacturing tolerances of the plates and separators, the last but one plate or the last but one separator of a stack has associated with it a preferably resilient claw 7, which belongs to the retaining device and which is approximately as thick as a plate or a separator, respectively. As is apparent from FIG. 3, the stack is properly retained in the magazine by the retaining device whereas the lowermost plate or the lowermost stack is released when the claws 8 have been retracted. Hence, the plate or separator can fall vertically onto the conveyor belt 11 by gravity.

The operation of the retaining devices of all magazines and the retraction of the claws 8, respectively, is effected approximately simultaneously. As a result, one negative plate and one positive plate and two separators in corresponding positions arrive on the conveyor belt 11 at the same time. This is shown in FIG. 1. The movement of the conveyor belt causes the plates and separators to be deposited in the desired order in a collecting box 12. In the meantime, the forward displacement of the claws 8 and the retracting of the retaining device 5–7 has been repeated so that the stacks of plates or separators are lowered onto the claws 8. When the plates and separators have been placed into the collecting box, the release of the now lowermost plate or separator of each stack onto the conveyor belt may be initiated.

The collecting box 12 is supported by springs so that it can be lowered and the plates can drop approximately through the same height from the conveyor belt. When receiving the first plate, the box is in its highest position. As the further plates and separators are being collected, their weight compresses the underlying springs so that the collecting box is pressed down.

For controlling the movement of the conveyor belt 11 and of the retaining device 5–7 and of the claws 8, a control wheel 13, e.g., may be provided, with which a circuit breaker 14 is associated. The number of cycles for collecting the number of plates and separators required in one block is determined by the control wheel 13. A circuit-closing switch 15 is associated with the collecting box 12. When the block has been removed from the collecting box 12, the same is lifted by its supporting springs so that the circuit-closing switch 15 starts the apparatus for the formation of the next block.

The collected blocks are now fed to an apparatus in which the positive and negative plates, respectively, are connected by soldered connections. The blocks are then introduced into storage battery housings.

What is claimed is:

1. Apparatus for arranging a plurality of platelike elements from different supplies in a predetermined sequence, which comprises a plurality of magazines which are horizontally spaced apart and have open bottom ends, each of said magazines being adapted to accommodate a vertical stack of platelike elements and having at least one, substantially vertical side wall, each of said magazines having associated with it bottom supporting means extendable to a position in which they are under such stack of platelike elements in said magazine, and engageable by the underside of such stack, and retaining means disposed opposite to said vertical side wall closely above said bottom supporting means and extendable to engage the side of said stack opposite to said side wall closely above said lowermost platelike element whereby the second platelike element from below is forced against said side wall whereas said lowermost platelike element is free to drop vertically from said stack unless its underside engages said bottom supporting means, said bottom supporting means and said retaining means being mutually independently and selectively extendable and retractable with respect to said stack, said apparatus comprising further a carrier which is disposed below and movable under each of said stacks and adapted to collect said platelike elements which have been dropped from said stacks.

2. Apparatus as set forth in claim 1, in which said bottom supporting means comprise retractable claws disposed at the bottom end of said magazines.

3. Apparatus as set forth in claim 1, in which said one side wall of each of said magazines constitutes a wide side wall and is adjoined by two narrow side walls whereas the magazine is open on the side opposite to said wide side wall, said retaining means being disposed at said open side.

4. Apparatus as set forth in claim 3, in which said bottom supporting means comprise a plurality of claws one of which is disposed at each of said narrow side walls and one on said open side of said magazine, each of said claws having a portion disposed laterally outside the magazine, said portion consisting of a pneumatic cylinder, in which a stationary piston is slidably arranged, said bottom supporting means comprising spring means engaging said cylinders to urge said claws into a position under said stack.

5. Apparatus as set forth in claim 1, which comprises a pivoted pressure lever carrying said retaining means.

6. Apparatus as set forth in claim 5, in which said pressure lever is pivoted on a horizontal axis above said retaining means and provided with a resilient gripping jaw disposed between said retaining means and said axis and engageable with the side of said stack opposite to said side wall.

7. Apparatus as set forth in claim 5, in which said pressure lever is pivoted on a horizontal axis above said retaining means and provided with a plurality of resilient gripping jaws, which are disposed one over the other between said retaining means and said axis and engageable with the side of said stack opposite to said side wall.

8. Apparatus as set forth in claim 1, in which each magazine is intended to accommodate platelike elements having a predetermined thickness and the retaining means associated with each of said magazines comprise a claw, which is adapted to engage the side of said stack opposite to said side wall closely above said lowermost platelike element whereby the second platelike element from below is faced against said side wall, said claw having a thickness which is approximately as large as the thickness of one of said platelike elements in said magazine and is vertically spaced from said bottom supporting means at least by the thickness of one of said platelike elements in said magazine when said bottom supporting means and said retaining means are extended.

9. Apparatus as set forth in claim 1, which comprises means for sequentially extending said bottom supporting means, retracting said retaining means, extending said retaining means, and retracting said bottom supporting means.

10. Apparatus for sequentially discharging individual platelike elements, said apparatus comprising a magazine which is adapted to accommodate a vertical stack of platelike elements and has at least one substantially vertical side wall, said magazine having associated with it bottom supporting means extendable to a position in which they are under such stack of platelike elements in said magazine, and engageable by the underside of such stack, and retaining means disposed opposite to said vertical side wall closely above said bottom supporting means and extendable to engage the side of said stack opposite to said side wall closely above said lowermost platelike element whereby the second platelike element from below is forced against said side wall whereas said lowermost platelike element is free to drop vertically from said stack unless its underside engages said bottom supporting means, said bottom supporting means and said retaining means being mutually independently and selectively extendable and retractable with respect to said stack.

11. Apparatus as set forth in claim 9, which comprises means for sequentially extending said bottom supporting means, retracting said retaining means, extending said retaining means, and retracting said bottom supporting means.

References Cited by the Examiner

UNITED STATES PATENTS

| | | | |
|---|---|---|---|
| 2,279,317 | 4/1942 | Hilger et al. | 136—176 |
| 2,523,910 | 9/1950 | Lund | 214—6 |
| 2,561,723 | 7/1951 | Berger | 214—6 |
| 2,680,510 | 6/1954 | Donath | 214—6 |
| 2,819,806 | 1/1958 | Vieth | 214—6 |
| 3,053,402 | 9/1962 | Russell et al. | 214—8.5 |
| 3,087,005 | 4/1963 | Sabatino et al. | 136—176 |
| 3,172,545 | 3/1965 | Schmid | 214—8.5 |

GERALD M. FORLENZA, *Primary Examiner.*

WINSTON A. DOUGLAS, *Examiner.*

D. L. WALTON, J. E. OLDS, *Assistant Examiners.*